Nov. 6, 1956  J. F. OCHWAT  2,769,523
ARTICLE CONVEYOR
Filed April 16, 1953  3 Sheets-Sheet 1

Inventor:
Joseph F. Ochwat,
by *Vernet C. Kauffman*
His Attorney.

Nov. 6, 1956 J. F. OCHWAT 2,769,523
ARTICLE CONVEYOR
Filed April 16, 1953 3 Sheets-Sheet 2

Inventor:
Joseph F. Ochwat,
by *Vernet C. Kauffman*
His Attorney.

Nov. 6, 1956 J. F. OCHWAT 2,769,523
ARTICLE CONVEYOR
Filed April 16, 1953 3 Sheets-Sheet 3

Inventor:
Joseph F. Ochwat,
by Vernet C. Kauffman
His Attorney.

United States Patent Office 2,769,523
Patented Nov. 6, 1956

2,769,523

ARTICLE CONVEYOR

Joseph F. Ochwat, Garfield Heights, Ohio, assignor to General Electric Company, a corporation of New York Application April 16, 1953, Serial No. 349,195

5 Claims. (Cl. 198—34)

My invention relates in general to an article conveyor device, and more particularly to a device for conveying lamp bulbs and other similarly shaped articles successively into and uniformly positioning them in an exact predetermined vertically arranged position.

In present day high-speed production manufacturing operations, such as in the manufacture of electric lamps, there are many instances where it is desirable to provide automatic means for conveying lamp bulbs or other articles to be processed successively into a predetermined position for subsequent operations to be performed thereon. For example, in the lamp bulb processing apparatus disclosed in U. S. application Serial No. 276,494, Reynolds et al., filed March 14, 1952, and now Patent No. 2,730,068, and assigned to the assignee of the present invention, it is desirable to provide an automatically operating bulb supplying or feeding mechanism for successively presenting the bulbs in a predetermined vertically arranged feeding position for the loading thereof, by automatic loading mechanism, into the bulb holders of the bulb processing apparatus. However, to insure the proper vertical positioning of the bulbs in the holders of the processing apparatus by the loading mechanism it is necessary that the bulb feeding means in turn uniformly position each successive bulb in approximately true vertically arranged position when located in its feeding position, in readiness for transfer to the processing apparatus by the loading mechanism. For such reasons, the use simply of a pair of continuously moving endless conveyor belts mounted in side-by-side relation and supporting the lamp bulbs therebetween in upright rested position thereon has been found to be unsatisfactory due to the tendency of the lamp bulbs, because of their peculiar shape, to ride up on and push against one another so as to become tilted, as a result of which they are then transferred to and loaded into the bulb holders of the processing apparatus by the loading mechanism in a correspondingly tilted position such as is undesirable.

It is an object of my invention therefore to provide an article conveying mechanism for transporting a row of articles such as lamp bulbs and the like and successively positioning them uniformly in a predetermined vertically arranged position.

Another object of my invention is to provide a lamp bulb conveyor mechanism for intermittently advancing a row of lamp bulbs and successively positioning the foremost bulb therein in a predetermined vertically arranged feeding position.

Still another object of my invention is to provide a conveyor mechanism of the above-mentioned character in which the advance movement of the lamp bulbs or other articles is interrupted during the interval when the foremost article in the row thereof on the conveyor is located in its predetermined vertically arranged feeding position.

According to one aspect of the invention, the conveyor comprises a pair of horizontally extending continuously moving side-by-side endless conveyor belts between and on which the articles are received and supported in a row in upright rested position thereon and which advance the row of articles so as to successively position the foremost one thereof in a predetermined limiting advance position as determined by the engagement thereof with a limiting stop means, the conveyor being additionally provided with article lift means operative, upon positioning of the said foremost article in its limiting advance position, to lift all the other articles on the conveyor belts up off the latter and thus interrupt their advance movement thereby, and to subsequently lower them back down onto the conveyor belts upon removal of the foremost article from the conveyor.

According to a further aspect of the invention, the article lift means, in addition to lifting the articles off the conveyor belts, is further arranged to intermittently separate the articles on the conveyor in a direction longitudinally thereof and to then progressively lower them back down onto the conveyor belts starting with the foremost article in the row thereof and continuing until the last article in the row is re-engaged with the conveyor belts.

Further objects and advantages of my invention will appear from the following detailed description of a species thereof and from the accompanying drawing in which:

Fig. 4 is a schematic side elevation of the conveyor mechanism and illustrating in dash-dot lines the articles and the lift means therefor in raised position.

Figure 1:
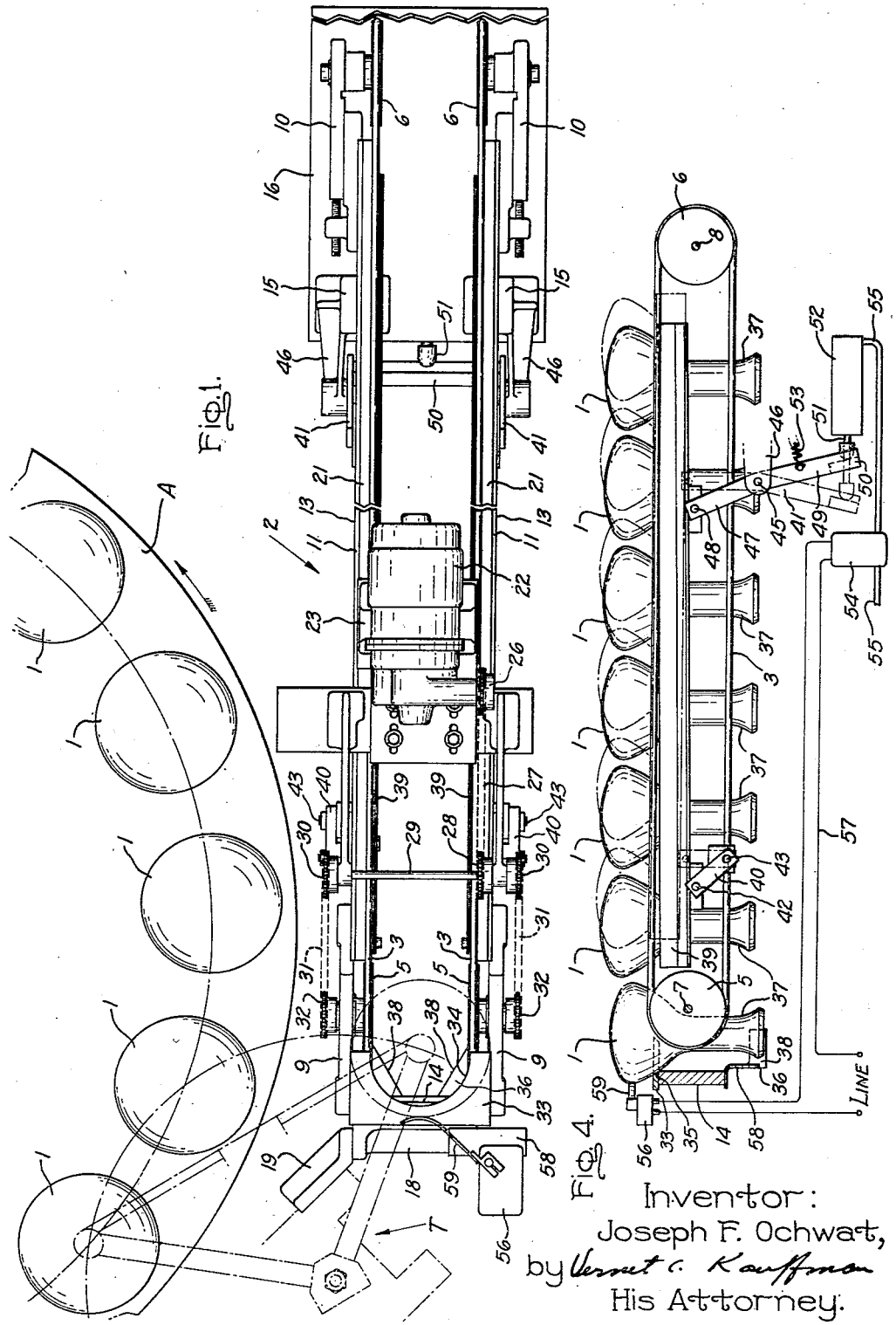
Fig. 1 is a plan view of an article conveyor mechanism according to the invention and illustrating diagrammatically an associated apparatus for cooperation therewith.

Referring to the drawings, the invention is there illustrated as embodied in a device for conveying lamp bulbs, such as are customarily employed for incandescent lamps, successively into a predetermined vertically arranged loading position for transfer into a bulb processing machine. The particular processing apparatus shown is a bulb prewashing and reflector coating machine of the general type disclosed and claimed in the previously mentioned co-pending U. S. application Serial No. 276,494 and comprising an intermittently indexing bulb prewashing turret A provided at regular intervals around its periphery with a plurality of bulb holders into which the bulbs 1 are successively loaded from the bulb supplying device 2 by transfer mechanism T operating in timed relation to the index movement of the turret A.

Figure 3:
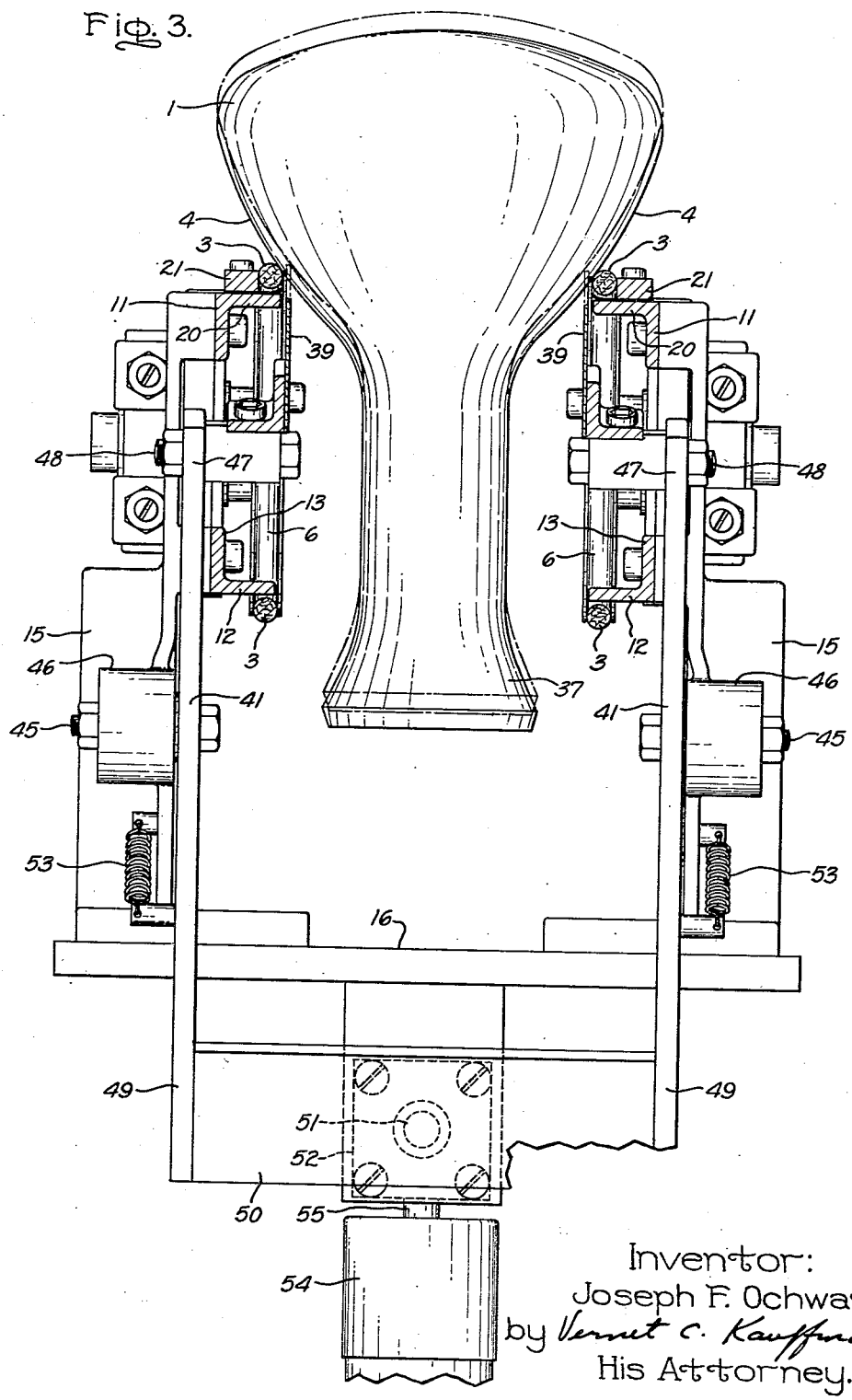
Fig. 3 is a transverse cross section taken on the line 3—3 of Fig. 2.

The conveyor or bulb supply device 2 comprises a spaced pair of horizontally extending side-by-side endless conveyor belts 3, 3, between which the bulbs are received and are advanced and on which they rest in vertical neck-down position as shown in Fig. 3, the conveyor belts for such purpose being laterally spaced a sufficient distance apart to engage the flaring side wall portions 4 of the bulbs at a level above the center of gravity of the bulbs so as to cause the latter to assume of their own accord a vertically upright neck-down position on the conveyor belts when placed thereon. The conveyor belts 3 are preferably made of round belting, such as leather or nylon belting for instance, and they extend taut between and run around respective sets of pulleys or sheaves 5 and 6 which are located respectively at the forward and rear ends of the conveyor and are carried by respective shafts 7 and 8 journalled in front and rear stationary bearing plates 9 and 10, respectively, which are located to the outward side of the pulleys. The front and rear bearing plates 9 and 10 on each side of the conveyor are joined together by and fastened to the opposite ends of respective sets of horizontally extending upper and lower angle iron frame members 11 and 12, respectively, located on the corresponding sides of the conveyor. Each set of front and rear bearing plates 9 and 10, together with its connecting angle iron members 11 and 12, constitutes the supporting framework 13 for its respective conveyor belt 3, and the two elongated side supporting frameworks 13 are held in proper laterally spaced relation at their forward ends by an end spacer member 14 fastened to the front bearing plates 9, 9, and adjacent their rearward end by a pair of upright spaced support brackets 15, 15 fastened to the angle irons 11, 12 at respective sides of the conveyor and mounted on and upstanding from the table portion 16 of a supporting pedestal 17 mounted either on the floor or on the supporting base or bed for the associated turret A. The front spacer member 14 is fastened to a bracket 18 which is in turn fastened to a stationary portion 19 of the associated transfer mechanism T to thereby support the forward end of the conveyor.

As shown in Fig. 3, the upper angle iron members 11, 11 of the side frameworks 13 are each arranged with one of their flanges 20 disposed horizontally and turned inwardly of the conveyor so as to underlie the upper runs of the respective conveyor belts 3, 3 and provide a support therefor serving to prevent them from sagging between their respective end support pulleys 5, 6. Also, to prevent the upper runs of the conveyor belts 3, 3 from spreading apart under the weight of the bulbs 1 resting thereon, the inturned flanges 20 on the upper angle iron members 11 are provided with longitudinally extending guide bars 21, 21 which are mounted on the upper sides of the flanges to the outward side of the respective conveyor belt 3 so as to form lateral guides or ways for the upper runs of the conveyor belts.

The two conveyor belts 3, 3 are continuously driven at corresponding uniform speeds by a combination electric motor-speed reducer unit 22 and associated chain and sprocket drives. The motor-speed reducer unit 22 is mounted in an overhead position above the conveyor on a fixed support comprising a table portion 23 mounted on a pair of upright support brackets 24, 24 fastened to the angle iron members 11, 12 of the respective side frameworks 13, 13 of the conveyor. The output shaft 25 of the motor-speed reducer unit 22 carries a sprocket 26 which is connected by a chain 27 to a sprocket 28 mounted on a cross shaft 29 journalled in the motor support table 23, and the cross shaft 29 carries a pair of additional sprockets 30, 30 which are connected by respective chains 31, 31 to corresponding sprockets 32, 32 located on the front pulley shafts 7, 7 to the outward side of the front bearing plates 9, 9.

At its forward end, the conveyor is provided with a bulb advance limiting stop or positioning seat comprising a horizontally disposed plate member 33 fastened to the upper side of the end spacer member 14 of the conveyor frame in a position bridging the gap across and disposed immediately adjacent the forward ends of the conveyor belts 3, 3. The rearwardly facing edge of the bulb seating plate 33 is formed with a semi-circular shaped recess 34 for accommodating the bulbs therein as they are successively discharged by and leave the forward ends of the conveyor belts 3, 3, the bulbs then coming to rest on and being thereafter supported in a limiting advance position by the upper edge 35 (Fig. 4) of the semi-circular recess 34 in the bulb seating plate 33. As shown more particularly in Fig. 4, the construction of the bulb supporting seat 35 and its arrangement relative to the conveyor belts 3, 3 is such as to provide in combination with the two conveyor belts, a three-point bulb supporting cradle preferably adapted to support the bulbs at a level slightly below the level occupied by the bulbs when riding along the upper run of the conveyor belts 3, 3, into which cradle support the bulbs are successively delivered by the conveyor belts and into which they drop during the operation of the mechanism. For this purpose, the bulb seating plate 33 is located at a level slightly below that of the upper run of the conveyor belts 3, 3, as shown, and the semi-circular recess 34 in the plate 33 may be formed to a diameter approximately the same as the lateral spacing between the conveyor belts 3, 3, as shown in Fig. 1.

To maintain the foremost bulb 1 on the conveyor in true vertical position during the interval when it is located in its limiting advance position resting on the seating plate 33, a bulb tilt-preventing stop 36 is provided on the end spacer member 14 for engaging with the lower end of the depending bulb neck 37. The said stop 36 is provided with forwardly converging stop surfaces 38, 38 (Fig. 1) forming a V-shaped recess into which the depending neck end 37 of the bulbs are guided by the engagement of the bulb necks with the converging stop surfaces 38. Once the bulb has been seated in true vertical position on the seat 35, with its neck end 37 in engagement with the stop surfaces 38, the neck end of the bulb is thereafter held in place against the stop surfaces 38 by the frictional force of the continuously moving conveyor belts 3 acting against the side wall of the bulb, such frictional force being directed forwardly and downwardly against the bulb so as to continuously exert a resultant force thereon tending to swing the neck end of the bulb forwardly against the stop surfaces 38, about the line of support of the bulb on the seat 35 as a pivot.

To prevent the bulbs 1 from becoming displaced into a tilted position on the conveyor belts 3 by the engagement of the bulbs with one another during their travel therealong, with the result that they might not be properly positioned in true vertical position on the seating plate 33, means are provided for spacing or separating the bulbs along the conveyor and maintaining them out of contact with each other. The said means comprises a bulb-elevating mechanism consisting of a pair of spaced side-by-side bulb-lifting bars 39, 39 which extend lengthwise of the conveyor alongside and immediately inward of the upper angle iron members 11 of the respective side frameworks 13. The lift bars 39 are movable between a lowered position (as shown in solid lines in Fig. 4) in which they are out of engagement with the bulbs 1 resting on the moving conveyor belts 3, and a raised position (as shown in dash-dot lines in Fig. 4) in which they engage and lift off the conveyor belts, all the bulbs thereon except the foremost one resting on the seating plate 33. Likewise the conveyor belts 3, the lift bars 39 are laterally spaced a sufficient distance apart to engage the flaring side walls 4 of the bulbs at a level above their center of gravity so that the bulbs assume of their own accord a vertically upright position on the lift bars when the latter are raised to their elevated position. The lift bars 39 are supported from below and adjacent their forward ends by front swing arms or links 40, 40 and adjacent their rearward ends by rear swing arms or levers 41, 41. The links 40 are pivotally connected at one end by pivot pins 42 to respective lift bars 39 and at their other ends by pivot pins 43 to the lower angle iron members 12 of the respective side frameworks 13. The levers 41 are pivotally connected, at points intermediate their length, by pivot pins 45 to arm extensions 46 formed on the respective side framework supporting brackets 15. At their outer ends, the upper arm portions 47 of the levers 41 are pivotally connected by pivot pins 48 to the lift bars 39. The lower arm portions 49 of the levers 41 are rigidly interconnected by a cross or tie bar 50 so as to cause them to swing in unison about their pivot points 45. Pivotal movement of the levers 41 acts to raise or lower the lift bars 39 between their two limiting elevational positions as determined by the engagement of the lever tie bar 50 with the end of a horizontally reciprocable actuating rod or pusher member 51.

Figure 2:
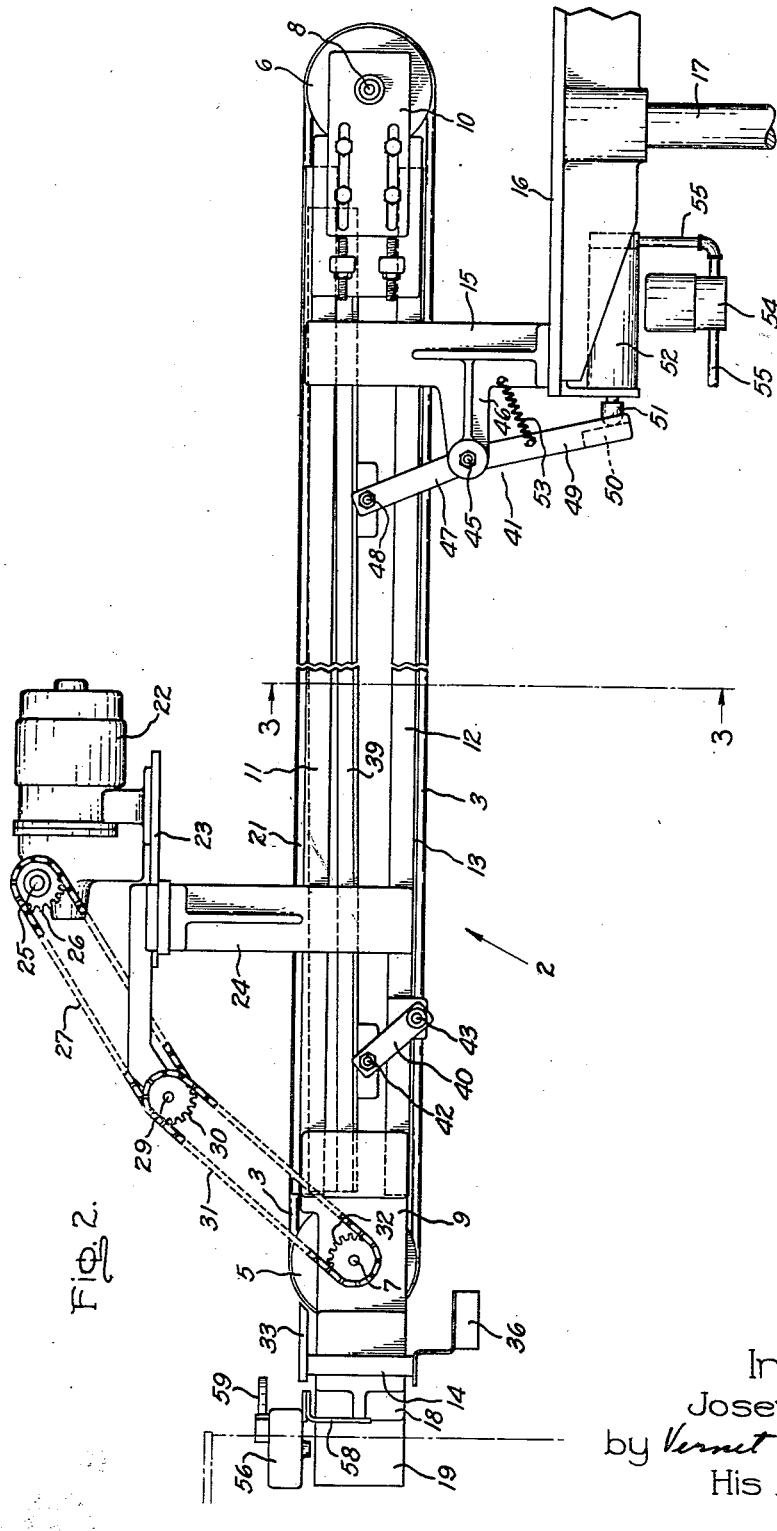
Fig. 2 is a side elevation of the article conveyor mechanism shown in Fig. 1.

As shown in Figs. 2 and 4, the length of the links 40 and the upper arm portions 47 of the operating levers 41 are so selected and arranged relative to each other as to position the bulb lift bars 39 in a substantially true horizontal position (as shown in dash-dot lines in Fig. 4) when the lift bars are raised to their elevated or operative position by swing movement of the operating levers 41 into a position in which their upper arm portions 47 extend approximately vertically as shown in dash-dot lines in Fig. 4, and to position the lift bars 39 in a slightly rearwardly inclined position (as shown in solid lines in Fig. 4) when they are returned to their lowered inoperative position by the operating levers 41. For this purpose the effective length of the upper arm portions 47 of the operating levers 41 are made longer than the effective length of the links 40 so that for a substantially corresponding degree of shifting movement of the upper ends of the links 40 and levers 41 lengthwise of the conveyor, while extending in a more or less vertical direction, the upper ends of the links 40 will move through a greater vertical distance than the upper ends of the levers 41.

Due to the above-described particular link and lever supporting arrangement for the bulb-lift bars 39, the said bars will, when raised to their elevated position, progressively pick up and lift the bulbs 1 off the conveyor belts 3 (excepting the foremost bulb resting on the seating plate 33), and at the same time shift them backwardly of the conveyor, beginning with the rearmost bulb on the conveyor belts and then continuing with each successive bulb in the row thereof on the belts. The backward shifting of the bulbs thus acts to space or separate them lengthwise of the conveyor. Upon subsequent return of the lift bars 39 to their lowered inoperative position, the bulbs 1 will then be progressively lowered back down onto and re-engaged with the moving conveyor belts 3, beginning with the foremost bulb on the lift bars and then continuing with each successive bulb in the row thereof on the bars. As a result, the bulbs are not only placed back on the moving conveyor belts 3 in spaced relation thereon, but the moving conveyor belts 3 will advance each bulb, as it is placed back thereon, a slight distance ahead before the next ensuing bulb is placed back on the conveyor belts. Thus, the moving conveyor belts 3 not only act to maintain the bulb separation effected by the previous upswing of the lift bars 39 and backward shifting of the bulbs thereby, but they also act to further separate the bulbs as they are returned to the conveyor belts by the lift bars. The resultant effect of the intermittent disengagement of the bulbs from the conveyor belts by the lift bars 39 is to prevent the bulbs from engaging with one another and thereby becoming tilted during the course of their travel through the conveyor, thus ensuring that they will be in true vertical position when placed in its final advanced feeding position on the bulb seating plate 33.

The pusher or actuating member 51 for the operating levers 41 is here shown as constituting the piston rod of an air cylinder 52 mounted on the table portion 16 of the support pedestal 17. The unitarily interconnected levers 41 and the piston rod 51 of the air cylinder 52 are normally held in retracted position, in which position the bulb lift bars 39 are in their lowered inoperative position, by a pair of tension coil springs 53 connected at one end to the lower arms 49 of the levers 41 and at their other ends to the respective side framework supporting brackets 15. The operation of the air cylinder 52 is controlled by an electrically operated solenoid valve 54 which is connected in the compressed air supply line 55 for the air cylinder and is operated by the opening and closing of a switch 56 connected in the electrical control circuit 57 (Fig. 4) for the valve. The switch 56 is mounted on the forward end of the conveyor on a bracket 58 fastened to the front conveyor support bracket 18, in a position such that its operating arm 59 is engaged and deflected into its closed position by each succeeding bulb 1 as it is advanced into and seated in position on the bulb seating plate 33 by the conveyor belts 3.

When the switch 56 is closed by one of the bulbs during the movement of the latter into seated position on the seating plate 33, the operating circuit 57 of the solenoid valve 54 is in turn closed and the valve actuated to cause it to open the air supply line 55 to the air cylinder 52, thus allowing compressed air to enter the rear end of the cylinder. The compressed air entering the cylinder 52 then moves the piston rod 51 forwardly through its advance stroke, causing it to push against the tie bar 50 connecting the two levers 41 and thus pivot the levers 41 in a direction to raise the lift bars 39 to their elevated position. The ascending lift bars 39 engage and lift the bulbs off the conveyor belts 3, thus interrupting their advance movement by the conveyor belts. When the foremost bulb in the conveyor is subsequently removed, as by the transfer mechanism T, from its feeding position seated on the seating plate 33, the operating arm 59 of the switch 56 swings open, thus opening the switch and breaking the control circuit 57 for the solenoid valve 54 which then closes, shutting off the compressed air supply line 55 while at the same time venting the cylinder 52. The springs 53 then pull and swing the levers 41 back to their inoperative position, as a result of which they return the piston rod 51 to its retracted position and lower the bulb lift bars 39 to their lowered inoperative position, whereby the bulbs thereon are placed back on the moving conveyor belts 3 and the advance movement of the bulbs along the conveyor re-initiated.

What I claim as new and desire to secure by Letters Patent of the United States is:

1. An article feeding device comprising a pair of horizontally extending side-by-side parallel endless conveyor belts for supporting the articles in a row therebetween, means connected with said belts for continuously moving them linearly to advance the articles therealong, article lift means comprising a pair of spaced parallel lift bars extending approximately parallel to and alongside respective ones of said conveyor belts, said bars being normally located in a lowered inopeartive position disengaged from the articles on the conveyor belts, and means for moving said bars upwardly and rearwardly, while held in a rearwardly inclined position, so as to progressively engage and lift off the conveyor belts and also separate all the articles thereon beginning with the rearmost article and excepting the forwardmost article.

2. A bulb feeding device comprising fixed support means, an endless conveyor mounted on said support means and comprising a pair of horizontally extending parallel endless conveyor belts for supporting the bulbs in a row therebetween in vertical neck-down position, means connected with said conveyor belts for continuously moving them linearly to advance the bulbs therealong, a bulb seating member mounted on said support means in a position opposite the forward end of said conveyor and forming, along with the forward end portions of the conveyor belts, a bulb seat on which the bulbs are supported in vertical neck-down position upon reaching the forwardmost end of the conveyor, a stop member mounted on said support means in a position to engage with the forward side of the depending neck portion of the bulb positioned on said seat so as to prevent forward displacement of the bulb neck and corresponding tilting of the bulb by the frictional force of the moving conveyor belts acting against the wall of the bulb resting thereon, bulb lift means on said support means comprising a pair of spaced parallel bars extending approximately parallel thereto and alongside respective ones of said conveyor belts, said bars being normally disengaged from the bulbs on said conveyor belts and movable upwardly into engagement with all the said bulbs on said conveyor belts other than the bulb located on the said seat to lift them off the moving conveyor belts and thus interrupt their advance movement therealong, and actuating means engageable with said bulb lift means to periodically elevate the said bars upon advance of each successive bulb into position on the said bulb seat to thereby cause the said bars to lift the said other bulbs off the conveyor belts.

3. An article feeding device comprising fixed support means, an endless conveyor mounted on said support means and comprising a pair of horizontally extending parallel endless conveyor belts for supporting the articles in a row therebetween and carrying them into a limiting forward delivery position adjacent the foremost end of the conveyor, means connected with said conveyor belts for continuously moving them linearly to advance the articles therealong, article lift means on said support means comprising a pair of spaced parallel bars extending approximately parallel to and alongside respective ones of said conveyor belts and front and rear swing arms pivotally connected to said support means and to said lift bars adjacent their forward and rearward ends, respectively, to swingingly support the said bars for swing movement longitudinally of the conveyor between a lowered inoperative position in which the bars are disengaged from the article on the conveyor belts and a raised operative position in which the bars engage and lift off the conveyor belts all the articles thereon other than the article located in said forward delivery position, the length of said front swing arms being different from that of said rear arms so as to cause the lift bars to shift from a slightly rearwardly inclined position when located in their lowered inoperative position to a horizontally extending position when located in their raised operative position, and actuating means engageable with said article lift means to periodically elevate the said bars upon advance of each successive article into its said forward delivery position.

4. An article feeding device substantially as set forth in claim 3 wherein the said swing arms support the said lift bars from below and the rear swing arms are of greater length than the front swing arms.

5. A bulb feeding device comprising fixed support means, an endless conveyor mounted on said support means and comprising a pair of horizontally extending parallel endless conveyor belts for supporting the bulbs in a row therebetween in vertical neck-down position, means connected with said conveyor belts for continuously moving them linearly to advance the bulbs therealong, a bulb seating member mounted on said support means in a position opposite the forward end of said conveyor and forming, along with the forward end portions of the conveyor belts, a bulb seat on which the bulbs are supported in vertical neck-down position upon reaching the foremost end of the conveyor, bulb lift means on said support means comprising a pair of spaced parallel bars extending approximately parallel to and alongside respective ones of said conveyor belts and front swing links and rigidly interconnected rear swing arms pivotally connected to said support means and to said lift bars adjacent their forward and rearward ends, respectively, and swingingly supporting the said bars from below for swing movement longitudinally of the conveyor between a lowered inoperative position in which the bars are disengaged from the bulbs on the conveyor belts and a raised operative position in which the bars engage and lift off the conveyor belts all the bulbs thereon other than the bulb located on said seat, the lengths of the said swing arms being greater than the lengths of the said links so as to cause the lift bars to shift from a slightly rearwardly inclined position when located in their lowered inoperative position to a horizontally extending position when located in their raised operative position, a compressed air cylinder mounted on said support means and having a piston rod engageable with the said interconnected swing arms to pivot them in a direction to swing the lift bars from their lowered to their raised position upon actuation of the air cylinder, spring means connected to said swing arms and to said support means to normally hold the said swing arms and associated lift bars in their lowered inoperative position, and means for actuating said air cylinder comprising an electrically operated valve in the compressed air supply line for said cylinder and a switch connected in the electrical operating circuit for said valve, said switch being mounted on said support means in a position adjacent the front end of said conveyor with its control arm positioned to be engaged by the foremost bulb on the conveyor, when advanced into its said seat, so as to close the said switch to thereby cause operation of said air cylinder.

References Cited in the file of this patent

UNITED STATES PATENTS

| | | |
|---|---|---|
| 1,355,488 | McKenny | Oct. 12, 1920 |
| 2,096,772 | Webster | Oct. 26, 1937 |
| 2,286,603 | Coumbe | June 16, 1942 |
| 2,439,883 | Brown | Apr. 20, 1948 |

FOREIGN PATENTS

| | | |
|---|---|---|
| 53,978 | Norway | Dec. 12, 1938 |